US011409601B1

(12) United States Patent
Brewer et al.

(10) Patent No.: US 11,409,601 B1
(45) Date of Patent: Aug. 9, 2022

(54) MEMORY DEVICE PROTECTION

(71) Applicant: Micron Technology, Inc., Boise, ID (US)

(72) Inventors: Tony M. Brewer, Plano, TX (US); Brent Keeth, Boise, ID (US)

(73) Assignee: Micron Technology, Inc., Boise, ID (US)

( * ) Notice: Subject to any disclaimer, the term of this patent is extended or adjusted under 35 U.S.C. 154(b) by 0 days.

(21) Appl. No.: 17/158,874

(22) Filed: Jan. 26, 2021

(51) Int. Cl.
*G06F 11/07* (2006.01)
*G06F 11/10* (2006.01)

(52) U.S. Cl.
CPC ........ *G06F 11/1068* (2013.01); *G06F 11/076* (2013.01); *G06F 11/0772* (2013.01); *G06F 11/1016* (2013.01)

(58) Field of Classification Search
CPC ............ G06F 11/1068; G06F 11/0772; G06F 11/1016; G06F 11/076
USPC .................................................. 714/764, 763
See application file for complete search history.

(56) References Cited

U.S. PATENT DOCUMENTS

| | | | | |
|---|---|---|---|---|
| 6,003,152 A * | 12/1999 | Singhal | ............... | G06F 11/1028 714/758 |
| 6,493,843 B1 | 12/2002 | Raynham | | |
| 7,096,407 B2 | 8/2006 | Olarig | | |
| 7,505,890 B2 * | 3/2009 | Kuznetsov | ............ | G06F 3/0664 714/763 |
| 8,291,297 B2 * | 10/2012 | Coulson | ............... | G06F 11/1068 714/764 |
| 8,516,354 B2 * | 8/2013 | Yang | .................... | G06F 11/1048 714/797 |
| 9,472,248 B2 | 10/2016 | Wilkerson et al. | | |
| 10,049,047 B1 | 8/2018 | Kotte et al. | | |
| 10,236,917 B2 | 3/2019 | Vaidhyanathan et al. | | |
| 2009/0172499 A1 * | 7/2009 | Olbrich | ................. | G06F 3/0659 714/773 |
| 2010/0122148 A1 * | 5/2010 | Flynn | .................... | G06F 11/108 714/773 |
| 2012/0110417 A1 | 5/2012 | D'Abreu et al. | | |
| 2013/0254627 A1 * | 9/2013 | Jeddeloh | ............... | G06F 11/108 714/764 |
| 2014/0146624 A1 * | 5/2014 | Son | ..................... | G06F 11/1048 365/200 |
| 2015/0019905 A1 | 1/2015 | Lastras et al. | | |
| 2015/0212875 A1 * | 7/2015 | Chen | ................... | G06F 11/1048 714/763 |

(Continued)

OTHER PUBLICATIONS

International Search Report and Written Opinion from related International Patent Application No. PCT/JS2021/061354, dated Mar. 25, 2022, 11 pages.

*Primary Examiner* — Albert Decady
*Assistant Examiner* — Enam Ahmed
(74) *Attorney, Agent, or Firm* — Brooks, Cameron & Huebsch, PLLC

(57) ABSTRACT

Systems, apparatuses, and methods related to memory device protection are described. A quantity of errors within a memory device can be determined and the determined quantity can be used to further determine whether to utilize single or multiple memory devices for an error correction and/or detection operation. Multiple memory devices need not be utilized for the error correction and/or detection operation unless a quantity of errors within the memory device exceeds a threshold quantity.

18 Claims, 9 Drawing Sheets

(56) References Cited

U.S. PATENT DOCUMENTS

| | | |
|---|---|---|
| 2015/0333773 A1* | 11/2015 | Fillingim .................. G06F 9/52 |
| | | 714/764 |
| 2016/0225436 A1* | 8/2016 | Wang .................... G06F 11/076 |
| 2017/0092379 A1* | 3/2017 | Kim ...................... G11C 7/1045 |
| 2018/0026661 A1* | 1/2018 | Ha ......................... G11C 29/52 |
| | | 714/764 |
| 2018/0046541 A1 | 2/2018 | Niu et al. |
| 2018/0060194 A1* | 3/2018 | Ryu .................... G06F 11/1666 |
| 2018/0267851 A1* | 9/2018 | Kaynak ............... G06F 11/1044 |
| 2021/0328601 A1* | 10/2021 | Porter ................... G11C 29/52 |

* cited by examiner

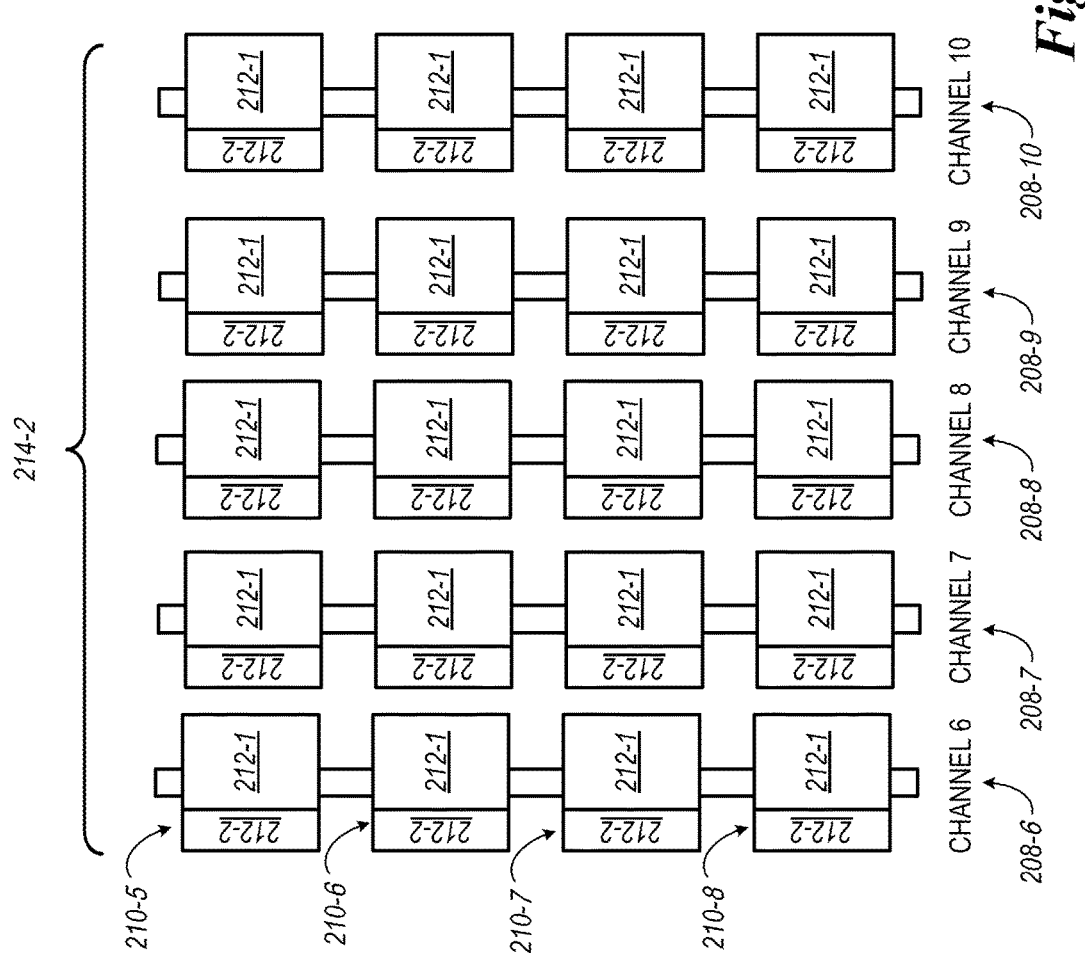

MEMORY DEVICE PROTECTION

TECHNICAL FIELD

The present disclosure relates generally to semiconductor memory and methods, and more particularly, to apparatuses, systems, and methods for memory device protection.

BACKGROUND

Memory devices are typically provided as internal, semiconductor, integrated circuits in computers or other electronic systems. There are many different types of memory including volatile and non-volatile memory. Volatile memory can require power to maintain its data (e.g., host data, error data, etc.) and includes random access memory (RAM), dynamic random access memory (DRAM), static random access memory (SRAM), synchronous dynamic random access memory (SDRAM), and thyristor random access memory (TRAM), among others. Non-volatile memory can provide persistent data by retaining stored data when not powered and can include NAND flash memory, NOR flash memory, and resistance variable memory such as phase change random access memory (PCRAM), resistive random access memory (RRAM), and magnetoresistive random access memory (MRAM), such as spin torque transfer random access memory (STT RAM), among others.

Memory devices may be coupled to a host (e.g., a host computing device) to store data, commands, and/or instructions for use by the host while the computer or electronic system is operating. For example, data, commands, and/or instructions can be transferred between the host and the memory device(s) during operation of a computing or other electronic system.

BRIEF DESCRIPTION OF THE DRAWINGS

FIGS. 2B-1/2B-2 illustrate another example configuration of memory devices with ECC data in relation to channels in accordance with a number of embodiments of the present disclosure.

FIGS. 2D-1/2D-2 illustrate yet another example configuration of memory devices with ECC data in relation to channels in accordance with a number of embodiments of the present disclosure.

DETAILED DESCRIPTION

Figure 1:
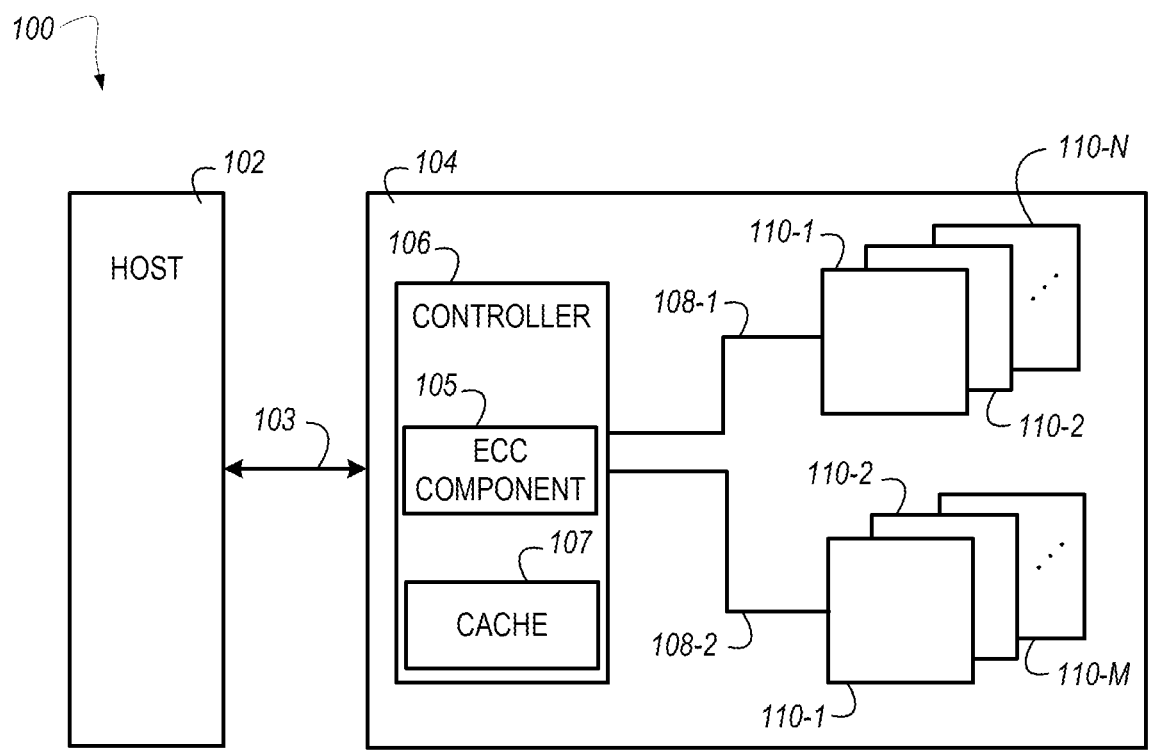
FIG. 1 is a functional block diagram in the form of a computing system including a host and an apparatus in the form of a memory system in accordance with a number of embodiments of the present disclosure.

Systems, apparatuses, and methods related to memory device protection are described. Data protection and recovery schemes are often an important aspect of RAS (Reliability, Availability, and Serviceability) associated with memory systems (e.g., memory modules). Such schemes may provide a "chip kill" capability, in which the memory system can work properly even if a constituent chip is completely damaged (e.g., non-functional). Due to increasing demands for larger capacity and higher bandwidth memory systems, it can be beneficial to provide improved data protection and recovery schemes.

Various embodiments of the present disclosure provide a protection scheme that can utilize a "Redundant Array of Independent Disks" (RAID) scheme to detect and/or correct errors across multiple memory devices (e.g., chips) of a memory system. RAID protection can allow data recovery within a memory system even if a constituent chip is completely damaged (e.g., non-functional).

In some RAID approaches, a separate channel can be configured as including memory devices for storing error detection/correction data (e.g., error correction code (ECC) data) for providing error correction/detection capabilities. The term "ECC" as used herein is intended to cover various types of error detection and/or correction data such as check sums, cyclic redundancy check (CRC) data, parity data, etc. In some prior RAID approaches, performing an error correction and/or detection operation inevitably requires the memory devices of the separate channel to be accessed despite that the memory devices of the separate channel are typically not accessed in normal operation of the memory system. In some RAID approaches, ECC data are distributed over multiple channels for providing an error correction/detection capability. In these approaches, multiple channels may always be required to be accessed each time an the error correction and/or detection operation is to be performed. Due to demands for an increased quantity of memory devices to be covered by RAID, such access to the separate channel and/or multiple channels can incur increased latencies that can substantially disturb operation of the memory system with the increased quantity of memory devices.

In contrast, embodiments described herein are directed to a memory system that provides a mechanism to reduce instances where memory devices of a separate channel or over multiple channels need to be accessed for an error correction and/or detection operation. This can be done by allowing a quantity of errors of a memory device not exceeding a particular quantity to be handled using ECC data within the same memory device. Therefore, the separate channel or multiple channels are accessed only when it is determined that a quantity of errors exceeds the threshold quantity and the reduced instances where multiple channels need to be accessed for the error correction and/or detection operation can further reduce latencies associated with the error correction and/or detection operation and further increase overall performance of the memory system.

In some embodiments, the memory system can be a Compute Express Link (CXL) compliant memory system (e.g., the memory system can include a PCIe/CXL interface). CXL is a high-speed central processing unit (CPU)-to-device and CPU-to-memory interconnect designed to accelerate next-generation data center performance. CXL technology maintains memory coherency between the CPU memory space and memory on attached devices, which allows resource sharing for higher performance, reduced software stack complexity, and lower overall system cost.

CXL is designed to be an industry open standard interface for high-speed communications, as accelerators are increasingly used to complement CPUs in support of emerging applications such as artificial intelligence and machine learning. CXL technology is built on the peripheral component interconnect express (PCIe) infrastructure, leveraging PCIe physical and electrical interfaces to provide advanced protocol in areas such as input/output (I/O) protocol, memory protocol (e.g., initially allowing a host to share memory with an accelerator), and coherency interface.

In the following detailed description of the present disclosure, reference is made to the accompanying drawings that form a part hereof, and in which is shown by way of illustration how one or more embodiments of the disclosure may be practiced. These embodiments are described in sufficient detail to enable those of ordinary skill in the art to practice the embodiments of this disclosure, and it is to be understood that other embodiments may be utilized and that process, electrical, and structural changes may be made without departing from the scope of the present disclosure.

As used herein, designators such as "N," "M," etc., particularly with respect to reference numerals in the drawings, indicate that a number of the particular feature so designated can be included. It is also to be understood that the terminology used herein is for the purpose of describing particular embodiments only, and is not intended to be limiting. As used herein, the singular forms "a," "an," and "the" can include both singular and plural referents, unless the context clearly dictates otherwise. In addition, "a number of," "at least one," and "one or more" (e.g., a number of memory banks) can refer to one or more memory banks, whereas a "plurality of" is intended to refer to more than one of such things.

Furthermore, the words "can" and "may" are used throughout this application in a permissive sense (e.g., having the potential to, being able to), not in a mandatory sense (e.g., must). The term "include," and derivations thereof, means "including, but not limited to." The terms "coupled" and "coupling" mean to be directly or indirectly connected physically or for access to and movement (transmission) of commands and/or data, as appropriate to the context.

The figures herein follow a numbering convention in which the first digit or digits correspond to the figure number and the remaining digits identify an element or component in the figure. Similar elements or components between different figures may be identified by the use of similar digits. For example, 110 may reference element "10" in FIG. 1, and a similar element may be referenced as 210 in FIG. 2. A group or plurality of similar elements or components may generally be referred to herein with a single element number. For example, a plurality of reference elements 110-1 to 110-N may be referred to generally as 110. As will be appreciated, elements shown in the various embodiments herein can be added, exchanged, and/or eliminated so as to provide a number of additional embodiments of the present disclosure. In addition, the proportion and/or the relative scale of the elements provided in the figures are intended to illustrate certain embodiments of the present disclosure and should not be taken in a limiting sense.

FIG. 1 is a functional block diagram in the form of a computing system 100 including a host 102 and an apparatus in the form of a memory system 104 in accordance with a number of embodiments of the present disclosure. As used herein, an "apparatus" can refer to, but is not limited to, any of a variety of structures or combinations of structures, such as a circuit or circuitry, a die or dice, a module or modules, a device or devices, or a system or systems, for example.

The host 102 can be a host system such as a personal laptop computer, a desktop computer, a digital camera, a smart phone, a memory card reader, and/or internet-of-thing enabled device, among various other types of hosts, and can include a memory access device, e.g., a processor (or processing device). One of ordinary skill in the art will appreciate that "a processor" can intend one or more processors, such as a parallel processing system, a number of coprocessors, etc. As an example, the host 102 can include a central processing unit (CPU).

The host 102 can include a system motherboard and/or backplane and can include a number of processing resources (e.g., one or more processors, microprocessors, or some other type of controlling circuitry). The system 100 can include separate integrated circuits or the host 102, the memory system 104 the controller 106, and the memory device 110 can be on the same integrated circuit. The system 100 can be, for instance, a server system and/or a high-performance computing (HPC) system and/or a portion thereof. Although the example shown in FIG. 1 illustrate a system having a Von Neumann architecture, embodiments of the present disclosure can be implemented in non-Von Neumann architectures, which may not include one or more components (e.g., CPU, ALU, etc.) often associated with a Von Neumann architecture.

As illustrated in FIG. 1, the host 102 is coupled to the memory system 104 via an interface 103. The interface 103 can be any type of communication path, bus, or the like that allows for information to be transferred between the host 102 and the memory system 104. Non-limiting examples of interfaces can include a peripheral component interconnect (PCI) interface, a peripheral component interconnect express (PCIe) interface, a serial advanced technology attachment (SATA) interface, and/or a miniature serial advanced technology attachment (mSATA) interface, among others. However, in at least one embodiment, the interface 103 is a PCIe 5.0 interface that is compliant with the compute express link (CXL) protocol standard. Accordingly, in some embodiments, the interface 103 can support transfer speeds of at least 32 gigatransfers per second.

Although not depicted in FIG. 1, the computing system 100 can include more than one memory system (e.g., memory system 104) that can be coupled to the host 102. One or more memory system (e.g., memory system 104) couplable to the host 102 can include various types of memory modules, such as single in-line memory modules, dual in-line memory modules, etc.

The memory system 104 includes a controller 106 and memory devices 110 that are communicatively coupled to the controller 106 via channels 108. In some embodiments, the controller 106 can be a media controller such as a non-volatile memory express (NVMe) controller. For example, the controller 106 can be configured to perform operations such as copy, write, read, error correct, etc. for the memory device 116. In addition, the controller 106 can include special purpose circuitry and/or instructions to perform various operations described herein. For example, in some embodiments, the controller 106 can include circuitry and/or instructions that can be executed to control movement of data and/or addresses associated with data between the host 102 and the memory devices 110 and/or among the memory devices 110.

The memory devices 110 can be various types of memory devices. For instance, the memory device can include RAM, ROM, DRAM, SDRAM, PCRAM, RRAM, and flash memory, among others. In embodiments in which the memory device 110 includes persistent or non-volatile memory, the memory device 110 can be flash memory devices such as NAND or NOR flash memory devices. Embodiments are not so limited, however, and the memory device 110 can include other non-volatile memory devices such as non-volatile random-access memory devices (e.g., NVRAM, ReRAM, FeRAM, MRAM, PCM), "emerging" memory devices such as a ferroelectric RAM device that includes ferroelectric capacitors that can exhibit hysteresis characteristics, a 3-D Crosspoint (3D XP) memory device, etc., or combinations thereof.

As an example, a ferroelectric RAM device can include ferroelectric capacitors and can perform bit storage based on an amount of voltage or charge applied thereto. In such examples, relatively small and relatively large voltages allow the ferroelectric RAM device to exhibit characteristics similar to normal dielectric materials (e.g., dielectric materials that have a relatively high dielectric constant) but at various voltages between such relatively small and large voltages the ferroelectric RAM device can exhibit a polarization reversal that yields non-linear dielectric behavior.

As another example, a 3D XP array of non-volatile memory can perform bit storage based on a change of bulk resistance, in conjunction with a stackable cross-gridded data access array. Additionally, in contrast to many flash-based memories, 3D XP non-volatile memory can perform a write in-place operation, where a non-volatile memory cell can be programmed without the non-volatile memory cell being previously erased.

A respective number of memory devices can be coupled to the controller 106 via a channel 108. For example, a number of memory devices 110-1, . . . , 110-N is coupled to the controller 106 via channels 108-1, . . . , 108-N, respectively. Embodiments are not limited to a particular quantity of memory devices that can be coupled to a single channel. As another example, a channel (e.g., one of the channels 108) can be coupled to a single memory device and/or multiple memory devices. In various embodiments, memory devices from multiple channels can be grouped together as ranks. Communication between the controller 106 and the memory devices 110 via channels 108 can be operated according to various protocols. Although embodiments are not limited to a particular protocol, an example protocol can include a double data rate (DDR) including DDR1 to 5 and/or Low-Power DDR (LPDDR) 1 to 5 (e.g., LPDDR 1 to LPDDR 5) as defined by the joint electron device engineering council (JEDEC).

The memory devices 110 coupled to different channels 108 can be accessed in parallel (e.g., simultaneously). Further, each memory device 110 of the same channel and/or different channels can be selectively accessed. For example, memory devices (e.g., memory devices 110) coupled to the same channel (e.g., one of the channels 108) with one memory device that is being accessed need not be accessed together. Similarly, memory devices coupled to one channel need not be accessed along with memory devices coupled to a different channel.

The controller 106 can further include an error correction component (ECC) component 105 and utilize the ECC component 105 to generate ECC data based on data received from the host 102 (e.g., host data). The ECC component 107 can be operated based on various types of ECC codes, such as Hamming codes, Reed-Solomon (RS) codes, Bose-Chaudhuri-Hochquenghem (BCH) codes, circular redundancy check (CRC) codes, Golay codes, Reed-Muller codes, Goppa codes, and Denniston codes, among others. ECC data generated using the ECC component 105 can be written to and stored in the memory devices 110 in various manners as further described/illustrated in connection with FIGS. 2A-2E.

The controller 106 can perform an error correction and/or detection operation using ECC data stored in the memory devices 110 and the ECC component 105. The error correction and/or detection operation performed using the ECC data stored in the memory devices 110 can provide multi-level error correction/detection capability on errors within the memory devices. As described herein, for example, a first level (of the multi-level) of error correction/detection capability can be provided using ECC data stored in one memory device that corrects a quantity of errors not exceeding a threshold quantity and using different ECC data stored in the same memory device that detects a quantity of errors exceeding the threshold quantity within the same memory device. Further, a second level (of the multi-level) of error correction/detection capability can be provided in the event that it is indicated that a quantity of errors may likely exceed the threshold quantity within one or more memory devices 110. In some embodiments, the second level of error correction/detection capability can be provided using one or more memory devices 110 configured to store a particular type of ECC data (that are designed to provide the second level of error correction/detection capability) without the memory device 110 necessarily being configured to store host data.

Although embodiments are not so limited, the controller 106 can generate (using the ECC component 105) ECC data by performing a number of XOR operations based on host data (e.g., data received from the host 102 illustrated in FIG. 1) and a predetermined set of data patterns. Because host data encoded with corresponding ECC data within a single codeword can be distributed over memory devices of multiple channels, any changes to data values stored in one or more memory devices of one channel can involve accessing other channels as well to generate new (e.g., updated) ECC data.

The controller 106 can write data (e.g., host data/ECC data) to the memory devices 110 with different types of writes. For example, the data can be written by performing a read-modify-write operation by applying a programming signal (e.g., a set or reset signal) only to those cells of a groups of cells having data values to be changed. A read-modify-write operation can be selectively chosen based on a quantity of channels to which the write operation is to be performed. For example, a read-modify-write operation can be performed to write data to one or more memory devices when the one or more memory devices are coupled to relatively fewer channels (e.g., a single or two channels). When writing data to memory devices coupled to relatively more channels (e.g., more than two channels), a normal write operation (e.g., applying a programming signal to all cells of a group of cells) can be performed to write the data.

In some embodiments, host data/ECC data stored in the memory devices 110 can be also accessed from a cache 107 of the controller 106. Although the cache 107 is illustrated to be located within the controller 106, embodiments are not limited to a particular location where the cache 107 can be located. For example, the cache 107 can be located and resides external to the controller 106. By accessing at least a portion of the host data/ECC data from the cache 107, latency and/or energy consumption that would have been incurred from accessing the host data/ECC data entirely from the memory devices 110 can be reduced.

The embodiment of FIG. 1 can include additional circuitry that is not illustrated so as not to obscure embodiments of the present disclosure. For example, each memory device 110 can include control circuitry, which further includes address circuitry to latch address signals provided over I/O connections through I/O circuitry. Address signals can be received and decoded by a row decoder and a column decoder to access an array of memory cells of the memory devices 110. It will be appreciated by those skilled in the art that the number of address input connections can depend on the density and architecture of the memory devices 110.

Figure 2A:
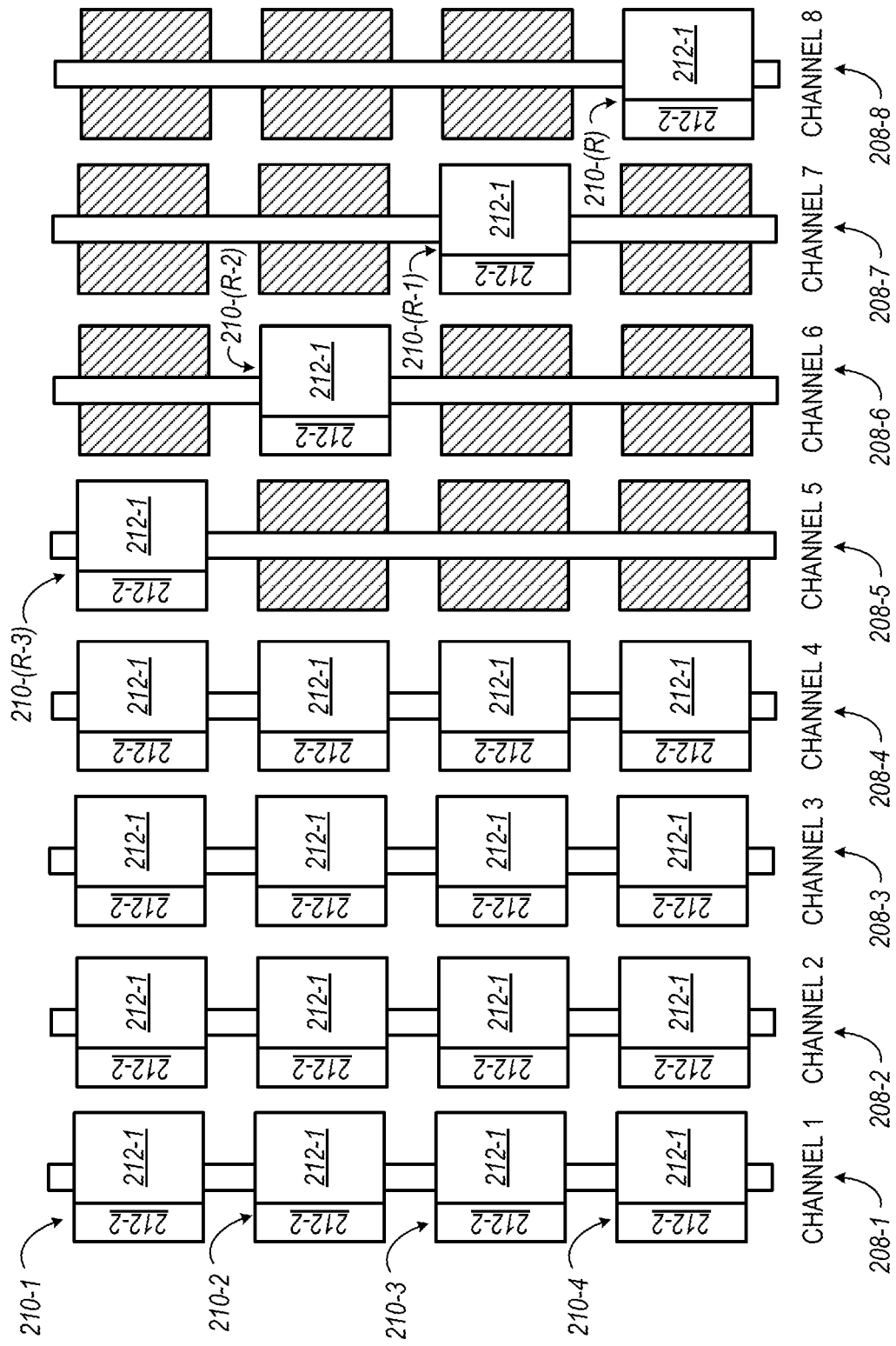
FIG. 2A illustrates an example configuration of memory devices with error correction code (ECC) data in relation to channels in accordance with a number of embodiments of the present disclosure.

FIG. 2A illustrates an example configuration of memory devices 210 with ECC data in relation to channels 208 in accordance with a number of embodiments of the present disclosure. The memory devices 210 and channels 208 are analogous to memory device 110 and channels 108, respectively, illustrated in FIG. 1. For example, at least one of the memory devices 210 can be an "emerging" memory device, as described above. Although FIG. 2 illustrates eight channels, embodiments are not limited to a particular quantity of channels.

The example illustrated in FIG. 2A includes eight channels 208-1 (CHANNEL 1) to 208-8 (CHANNEL 8). Each channel 208 comprises four memory devices corresponding to four ranks. Embodiments are not limited to a particular quantity of channels or to a particular quantity of memory devices per channel. For example, four memory devices 210-1 to 210-4 are coupled to a channel 208-1. The channels 208-5 (CHANNEL 5), 208-6 (CHANNEL 6), 208-7 (CHANNEL 7), and 208-8 (CHANNEL 8) are coupled to memory devices 210-(R-3), 210-(R-2), 210-(R-1), and 210-R, respectively. Although one memory device is illustrated in connection with each one of the channels 208-5, 208-6, 208-7, and 208-8, more quantity of memory devices can be coupled to channels 208-5, 208-6, 208-7, and 208-8, such as four memory devices as described in connection with the channels 208-1 (CHANNEL 1), 208-2 (CHANNEL 2), 208-3 (CHANNEL 3), and 208-4 (CHANNEL 4). Each channel can be independently operated. For example, memory devices coupled to different channels can be accessed by a controller (e.g., controller 106 illustrated in FIG. 1) in parallel (e.g., simultaneously).

The memory devices 210 can include multiple banks. In the example illustrated in FIG. 2A, the memory devices are illustrated as including a first portion 212-1 and a second portion 212-2. The portions 212-1 and 212-2 can be portions of one bank, or portions of different banks. In various embodiments, the portions 212-1 and 212-2 can be used to store different types of data. For instance, in an example in which portions 212-1 and 212-2 are within a same bank, a first portion 212-1 can be used to store a particular amount of data (e.g., 64B user data), and a second portion 212-2 can be used to store a particular amount of ECC data (e.g., 4B) corresponding to the 64B data stored in the first portion 212-1. As an example, the data stored in portion 212-1 may be accessed via a burst length of 32, and the corresponding ECC data stored in portion 212-2 may be accessed via a burst length of 16.

In some embodiments, the portions 212-1 and 212-2 of each of the memory devices 210 can correspond to separate banks. For example, portion 212-1 can correspond to a first bank, and portion 212-2 can correspond to a second (e.g., different) bank. The separate banks 212-1 and 212-2 can be accessed in a serial manner. For example, the bank 212-2 can be accessed subsequent to the bank 212-1 being accessed. Although not depicted in FIG. 2A, the memory devices 210 can include more than one or two banks. For example, an example memory device can include 16 or 32 banks.

In some embodiments in which a single bank stores data (including single channel error-correction data) in a first portion 212-1 and corresponding single channel error-detection data (e.g., CRC check data) in a second portion 212-2, the portions 212-1 and 212-2 can be accessed in parallel (e.g., via different pins). For example, the portion 212-2 storing the single channel error-detection data can be accessed via data mask (DM) pins, while the data stored in portion 212-1 can be accessed via different pins, such as a bi-directional DQ pins. There are other types of data that can also be accessed via the DM pins, such as metadata. As used herein, the term "single channel error-correction data" refers to data used to perform an error correction operation that involves reading data from memory device(s) coupled to a single channel. As used herein, the term "single channel error-detection data" refers to data used to perform an error detection operation that involves reading data from memory device(s) coupled to a single channel.

In the embodiment illustrated in FIG. 2A, the single channel error-detection data stored in the portion 212-2 of each one of the memory devices 210 can provide an error detection capability of detecting a quantity of errors exceeding a threshold quantity within data stored in the memory device (e.g., in portion 212-2 of the memory device).

Memory devices coupled to the channels 208-1 to 208-4 can include host data (e.g., data received from the host 102 illustrated in FIG. 1) in a particular location, such as in the portion 212-1. In some embodiments, the portion 212-1 of each one of the memory devices 210 coupled to the channels 208-1 to 208-4 can further include single channel error-correction data for correcting a quantity of errors (within the same memory device) not exceeding a threshold quantity. For example, the ECC data stored in the portion 212-1 of the memory device 210 can be utilized for correcting the quantity of errors not exceeding the threshold quantity.

In an embodiment illustrated in FIG. 2A, the memory system (e.g., the memory system 104 illustrated in FIG. 1) includes four channels 208-5 to 208-8. As used herein, the term "ECC channel" refers to a channel including (e.g., coupled to) one or more memory devices storing multi-channel error-correction data for correcting a quantity of errors exceeding a threshold quantity. As used herein, the term "multi-channel error-correction data" refers to data used to perform an error correction operation that involves reading data from memory device(s) coupled to multiple channels, as described further herein. An "ECC channel" may also be referred to herein as a "redundant channel."

In this example, the four memory devices 210-(R-3), 210-(R-2), 210-(R-1), and 210-R (of the ECC channels 208-5 to 208-8) can be referred to as "redundant" memory devices and are configured to store multi-channel error-correction data for correcting a quantity of errors exceeding a threshold quantity via a RAID approach. For example, when it is determined that a particular memory device 210 corresponding to one of channels 208-1 to 208-4 contains a quantity of errors exceeding a threshold quantity, the multi-channel error-correction data (e.g., parity data) stored in a corresponding one of the redundant memory devices can be used to correct the erroneous data of the particular memory device. As an example, if a read operation performed on particular one of the memory devices 210 corresponding to 208-4 (e.g., one of the memory devices located on a same row with the memory device 210-1 and coupled to CHANNEL 4) results in an uncorrectable error (e.g., the quantity of errors in the read data exceeds the threshold correctable by the single channel error-correction data), then the data stored in the particular memory device may be recovered by reading data from the memory devices 210 corresponding to the other of channels 208-1 to 208-4 (e.g., the memory device 210-1 coupled to CHANNEL 1 and other memory devices located on a same row with the memory device 210-1 and coupled to CHANNELS 2-3) along with the multi-channel error-correction data from the corresponding redundant memory device 210-(R-3) of ECC channel 208-5 (CHANNEL 5). For instance, an XOR of the data read from the "good" channels (e.g., CHANNELS 1-3) and the multi-channel error-correction data read from redundant memory device 210-(R-3) of CHANNEL 5 can be used to correct (e.g., recover) the erroneous data read from device 210-1 of CHANNEL 4.

The memory system (e.g., the memory system 104 illustrated in FIG. 1) illustrated in FIG. 2A can have an overhead of 31.25% (e.g., 25%+6.25%). For example, a ratio of a quantity of redundant memory devices (e.g., memory devices 210-(R-3), 210-(R-2), 210-(R-1), 210-R) to those memory devices (16 memory devices) storing host data is ¼ (25%) and a ratio of a size of single channel error-correction data stored in each portion 212-2 to a size of each portion 212-1 (and/or data stored in each portion 212) is 4/64 (6.25%). In some embodiments, the multi-channel error-correction data (e.g., stored in the portions 212-1 of the memory devices 210-(R-3), 210-(R-2), 210-(R-1), and 210-R) for providing the error correction capability can be parity data.

Although embodiments are not so limited, a threshold quantity described herein can correspond to a single error. For example, in an embodiment illustrated in FIG. 2A, each one of the memory devices 210 can include single channel error-correction data for correcting a single error or multi-channel error-correction data detect multiple errors (e.g., errors more than a single error) within the same memory device, while at least one memory device coupled to a second portion of channels (e.g., channels 208-5 to 208-8) can include multi-channel error-correction data for correcting multiple errors (e.g., more than a single error) within one or more memory devices of channels 208-1 to 208-4 as well as channels 208-5 to 208-8.

The operational role of the channels (e.g., channels 208) can be swapped to balance a quantity of accesses across the channels and to avoid a "hot spot" and prevent one channel from being accessed more frequently than other channels. As described herein, for example, the left four channels 208-1 to 208-4 of FIG. 2A are configured to store host data in their respective portions 212-1, while the right four channels 208-5 to 208-8 are configured as ECC channels and to store multi-channel error-correction data. To avoid channels 208-1 to 208-4 from being accessed more frequently than other channels 208-5 to 208-8 (because host data are likely to be accessed more frequently than multi-channel error-correction data), at some point, the channels 208-1 to 208-4 can be configured as ECC channels and to store multi-channel error-correction data, while the other channels 208-5 to 208-8 that were previously configured as ECC channels can be configured to store host data.

Figures 1, 2B:
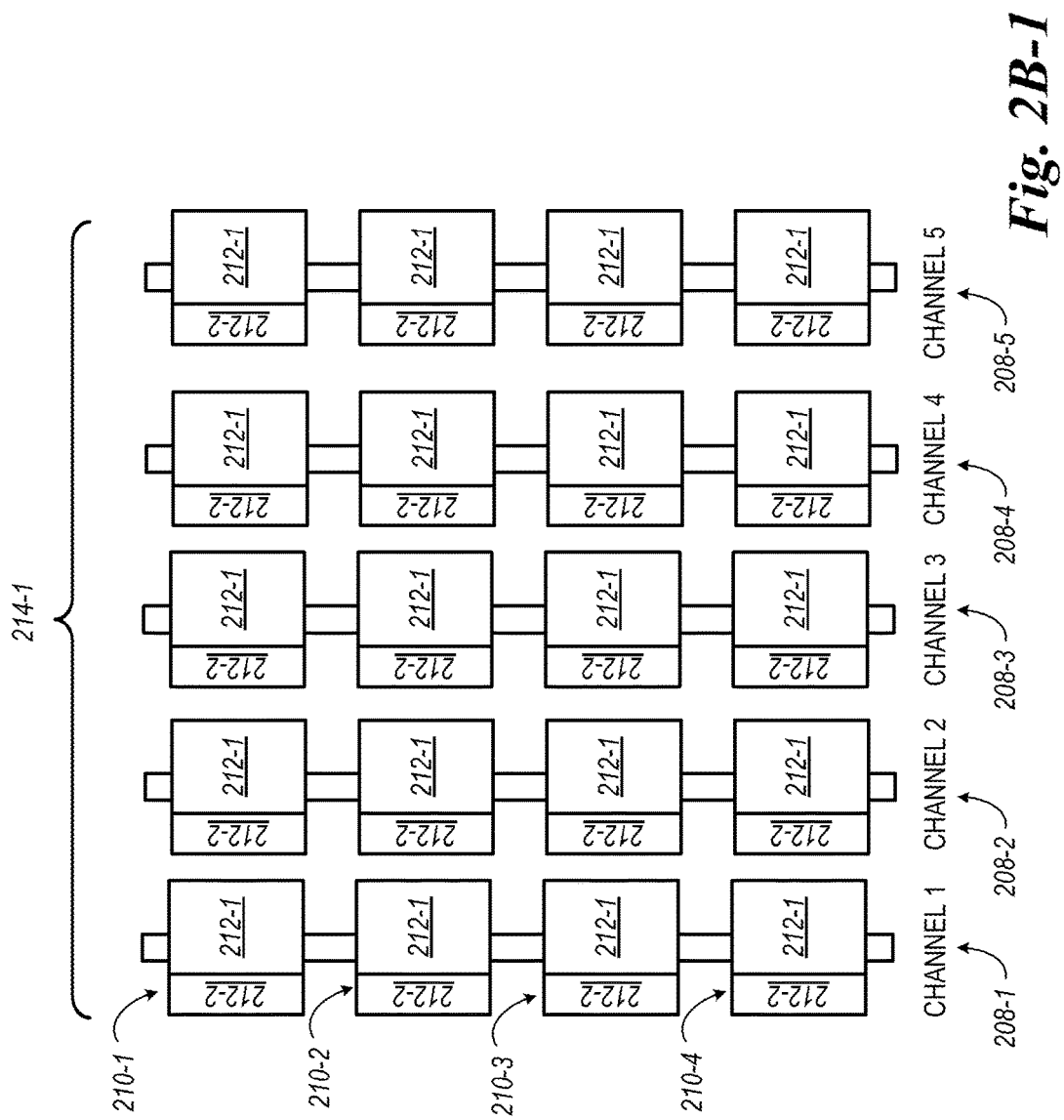

FIGS. 2B-1/2B-2 (collectively referred to as FIG. 2B) illustrate another example configuration of memory devices 210 with ECC data in relation to channels 208 in accordance with a number of embodiments of the present disclosure. The memory devices 210 and channels 208 illustrated in FIG. 2B are analogous to memory devices 210 and channels 208, respectively, illustrated in FIG. 2A. For example, one of portions (e.g., portions 212-2) of the memory devices 210 can store multi-channel error-correction data (e.g., CRC) to provide an error detection capability of detecting a quantity of errors exceeding a threshold quantity, such as a single error, within respective memory devices. In some embodiments, a different portion (e.g., 212-1) of the memory devices 210 can store host data (as well as single channel error-correction data to provide an error correction capability of correcting a quantity of errors not exceeding the threshold quantity) or multi-channel error-correction data (e.g., parity data) to provide an error correction capability of correcting a quantity of errors exceeding the threshold quantity. At least one of the memory devices 210 can be an "emerging" memory device, as described above. Although FIG. 2 illustrates ten channels, embodiments are not limited to a particular quantity of channels.

The example illustrated in FIG. 2B includes ten channels 208-1 (CHANNEL 1) to 208-10 (CHANNEL 10). Each channel 208 includes four memory devices corresponding to four respective ranks. Embodiments are not limited to a particular quantity of channels or to a particular quantity of memory devices per channel (or per rank). FIG. 2B further illustrates two sets of memory devices 210 including a first set of memory devices 214-1 and a second set of memory devices 214-2. Each set can include its own channel that can operate as an ECC channel for a respective set. For example, a channel 208-5 (CHANNEL 5) of the set 214-1 can operate as an ECC channel for channels 208-1 to 208-4 (CHANNELS 1-4) of the set 214-1, while a channel 208-10 (CHANNEL 10) of the set 214-2 can operate as an ECC channel for channels 208-6 to 208-9 (CHANNELS 6-9) of the set 214-2.

As described herein, each ECC channel can provide an error correction capability of correcting errors exceeding the threshold quantity. For example, when it is determined that a particular memory device 210 corresponding to one of channels 208-1 to 208-4 contains a quantity of errors exceeding a threshold quantity, the multi-channel error-correction data (e.g., parity data) stored in a corresponding one of the redundant memory devices (e.g., one of the memory devices 210 corresponding to channel 208-5) can be used to correct the erroneous data of the particular memory device. As an example, if a read operation performed on particular one of the memory devices 210 corresponding to 208-4 (e.g., one of the memory devices located on a same row with the memory device 210-1 and coupled to CHANNEL 4) results in an uncorrectable error (e.g., the quantity of errors in the read data exceeds the threshold correctable by the single channel error-correction data), then the data stored in the particular memory device may be recovered by reading data from the memory devices 210 corresponding to the other of channels 208-1 to 208-4 (e.g., the memory device 210-1 coupled to CHANNEL 1 and other memory devices located on a same row/rank with the memory device 210-1 and coupled to CHANNELS 2-3) along with the multi-channel error-correction data from the corresponding redundant memory device of channel 208-5 (CHANNEL 5) that is on a same row/rank with the memory device 210-1.

As described above, the operational role of the channels (e.g., channels 208) can be swapped to balance a quantity of accesses across the channels and to avoid a "hot spot" and prevent one channel from being accessed more frequently than other channels. As described herein, for example, the four channels 208-1 to 208-4 of FIG. 2B-1 (or four channels 208-6 to 208-9 of FIG. 2B-2) are configured to store host data in their respective portions 212-1, while a channel 208-5 of FIG. 2B-1 (or channel 208-10 of FIG. 2B-2) are configured as a ECC channel and to store multi-channel error-correction data for the channels 208-1 to 208-4 (or the channels 208-6 to 208-9). To avoid channels 208-1 to 208-4 (or channels 208-6 to 208-9) from being accessed more frequently than the ECC channel 208-5 (or ECC channel 208-10), at some point, one of the channels 208-1 to 208-4

(or channels 208-6 to 208-9) can be configured as a ECC channel and to store multi-channel error-correction data, while the channel 208-5 (or channel 208-10) that was previously configured as a ECC channel can be configured to store host data.

As another example, when it is determined that a particular memory device 210 corresponding to one of channels 208-6 to 208-9 contains a quantity of errors exceeding a threshold quantity, the multi-channel error-correction data (e.g., parity data) stored in a corresponding one of the redundant memory devices (e.g., one of the memory devices 210 corresponding to channel 208-10) can be used to correct the erroneous data of the particular memory device. As an example, if a read operation performed on particular one of the memory devices 210 corresponding to 208-9 (e.g., one of the memory devices located on a same row with the memory device 210-5 and coupled to CHANNEL 9) results in an uncorrectable error (e.g., the quantity of errors in the read data exceeds the threshold correctable by the single channel error-correction data), then the data stored in the particular memory device may be recovered by reading data from the memory devices 210 corresponding to the other of channels 208-6 to 208-8 (e.g., the memory device 210-5 coupled to CHANNEL 6 and other memory devices located on a same row/rank with the memory device 210-5 and coupled to CHANNELS 7-8) along with the multi-channel error-correction data from the corresponding redundant memory device of channel 208-10 (CHANNEL 10) that is on a same row/rank with the memory device 210-5.

Although embodiments are not so limited, portions 212-1 and 212-2 of each memory device 212 can be within a same bank. For example, host data (e.g., stored in the portion 212-1) as well as single channel error-detection data (e.g., stored in the portion 212-2) can be accessed from the same bank. In some embodiments, the portion 212-2 of one or more of the memory devices 210 can be accessed via DM pins, while the portion 212-1 of one or more of the memory devices 210 can be accessed via different pins, such as bi-directional DQ pins. There are other types of data that can also be accessed via the DM pins, such as metadata that can be stored in the memory devices 210. Although not depicted in FIG. 2B, each memory device (e.g., memory devices 210) can include more than one or two banks. For example, an example memory device can include 16 and/or 32 banks.

The configuration of the memory devices 210 in relation to the channels 208 illustrated in FIG. 2B can have a greater capacity than the configuration illustrated in FIG. 2A. For example, the configuration of FIG. 2B can have a capacity of 320 GB among which 256 GB can be used for storing host data, while the configuration of FIG. 2A can have a capacity of 256 GB among which 80% can be used for storing host data. In this example, therefore, the configuration of FIG. 2B can provide a capacity of power of 2 (e.g., $2^8$=256), while the configuration of FIG. 2A does not.

Figure 2C:
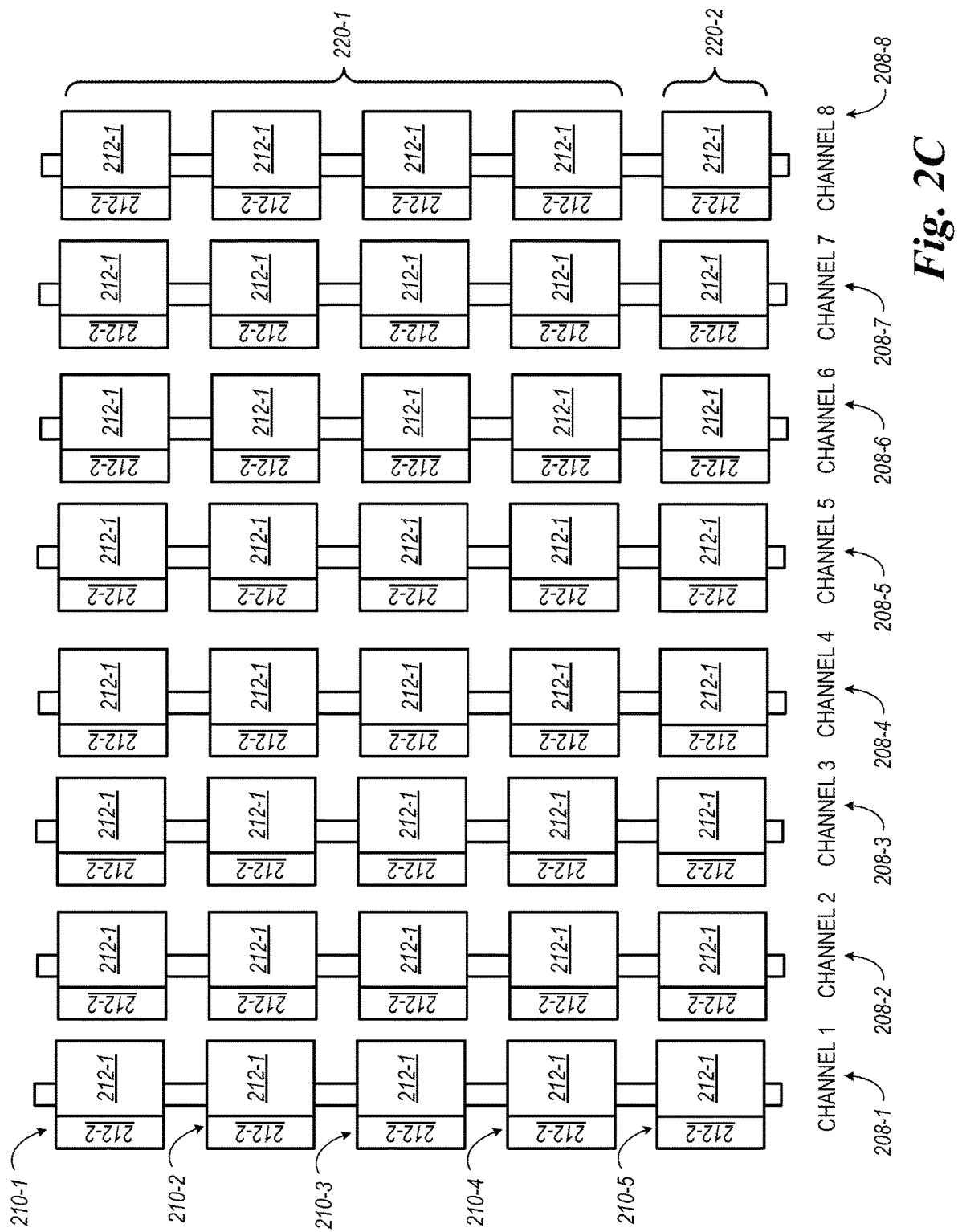
FIG. 2C illustrates yet another example configuration of memory devices with ECC data in relation to channels in accordance with a number of embodiments of the present disclosure.

FIG. 2C illustrates yet another example configuration of memory devices 210 with ECC data in relation to channels 208 in accordance with a number of embodiments of the present disclosure. The memory devices 210 and channels 208 illustrated in FIG. 2C are analogous to memory devices 210 and channels 208, respectively, illustrated in FIGS. 2A-2B. For example, one of portions (e.g., portions 212-2) of the memory devices 210 can include single channel error-detection data (e.g., CRC) to provide an error detection capability of detecting errors exceeding a threshold quantity, such as a single error, within respective memory devices. In some embodiments, a different portion (e.g., 212-1) of the memory devices 210 can include host data (as well as single channel error-correction data to provide an error correction capability of correcting a quantity of errors not exceeding the threshold quantity) or multi-channel error-correction data (e.g., parity data) to provide an error correction capability of correcting a quantity of errors exceeding the threshold quantity. At least one of the memory devices 210 can be an "emerging" memory device, as described above. The example illustrated in FIG. 2C includes eight channels 208-1 (CHANNEL 1) to 208-8 (CHANNEL 8). Each channel 208 includes five memory devices corresponding to five ranks. Embodiments are not limited to a particular quantity of channels or to a particular quantity of memory devices per channel.

Although embodiments are not so limited, portions 212-1 and 212-2 of each memory device 212 can be within a same bank. For example, host data (e.g., stored in the portion 212-1) as well as multi-channel error-correction data (e.g., stored in the portion 212-2) can be accessed from the same bank. In some embodiments, the portion 212-2 of one or more of the memory devices 210 can be accessed via DM pins, while the portion 212-1 of one or more of the memory devices 210 can be accessed via different pins, such as bi-directional DQ pins. There are other types of data that can also be accessed via the DM pins, such as metadata that can be stored in the memory devices 210. Although not depicted in FIG. 2C, each memory device (e.g., memory devices 210) can include more than one or two banks. For example, an example memory device can include 16 and/or 32 banks.

FIG. 2C illustrates groups of memory devices, such as first groups of memory devices 220-1 (e.g., each row of memory devices corresponding to a group of memory devices) and a second group of memory devices 220-2. Although not depicted in FIG. 2C, each group of memory devices (e.g., each one of the first groups of memory devices 220-1 and/or second group of memory device 220-2) can be selectively accessed from the other groups. For example, one or more memory devices 210 of the groups of memory devices 220-1 can be selectively accessed without memory devices 210 of the group 220-2 being necessarily accessed along with the one or more memory devices 210 of the groups 220-1.

Unlike the embodiments illustrated in FIG. 2A or FIG. 2B, there is no separate channel that can operate as an ECC channel for the memory devices 210 illustrated in FIG. 2C. Rather, memory devices 210 of the group 220-2 can operate as for providing an error correction capability of correcting a quantity of errors exceeding a threshold quantity for one or more memory devices 210 of the groups of memory devices 220-1. For example, while respective portions 212-1 of the groups 220-1 include host data, respective portions 212-1 of the group 212-2 include multi-channel error-correction data for correcting a quantity of errors exceeding the threshold quantity. As an example, if a read operation performed on particular one of the memory devices 210-1 results in an uncorrectable error (e.g., the quantity of errors in the read data exceeds the threshold correctable by the single channel error-correction data), then the data stored in the memory device 210-1 may be recovered by reading data from the memory devices 210-2, 210-3, 210-4 of the group 220-1 along with the multi-channel error-correction data from the corresponding redundant memory device 210-5 of the group 220-2.

In a non-limiting example, an apparatus (e.g., the computing system 100 or the memory system 104 illustrated in FIG. 1) can include a group of memory devices (e.g., memory devices 110/210 illustrated in FIGS. 1 and 2, respectively) and a controller coupled to the group of memory devices. The controller can perform, using first ECC data stored in a first portion (e.g., portion 212-1) of the group of memory devices, an error detection operation on the first portion for indication of a quantity of errors exceeding a threshold quantity within the first portion. Responsive to the indication the quantity of errors within the first portion exceeding the threshold quantity, the controller can perform an error correction operation on the first portion using at least second ECC data. The second data can be stored in a second portion (e.g., portion 212-2) of the group of memory devices that is coupled to a different channel to which the first portion of the group of memory devices is coupled. In some embodiments, the second ECC data can include parity bits.

In some embodiments, the first ECC data and host data can be stored in a same bank of the first portion of the group of memory devices. In some embodiments, the controller can be coupled to the first portion of the group of memory devices via a plurality of pins including a DM pin. The controller can receive the host data via a first portion of the plurality of pins and receive, in parallel with the data, the first ECC data via a second portion of the plurality of pins including the DM pin.

In some embodiments, host data can be stored in a first bank and the first ECC data can be stored in a second bank. Further, a cache (e.g., the cache 107 illustrated in FIG. 1) can be coupled to the controller and the controller can receive, in response to the cache storing the first ECC data, the first ECC data from the cache without receiving the first ECC data from the second bank. Continuing with this example, the controller can further receive the host data from the first bank of the first portion of the group of memory devices and perform, using third ECC data stored in the first bank, an error correction operation to correct a quantity of errors not exceeding the threshold quantity and within the host data.

Figures 1, 2D:
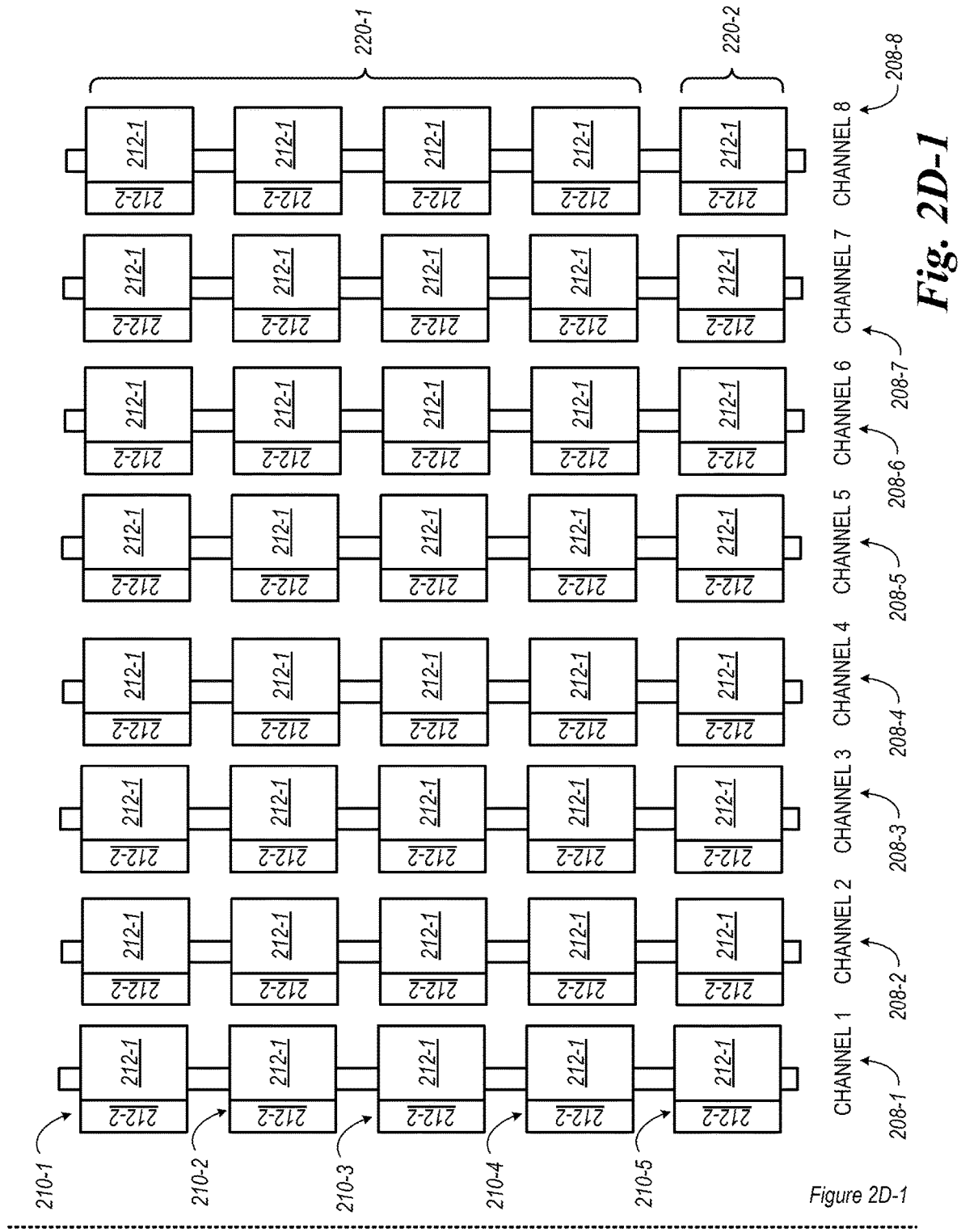
Figures 2, 2D:
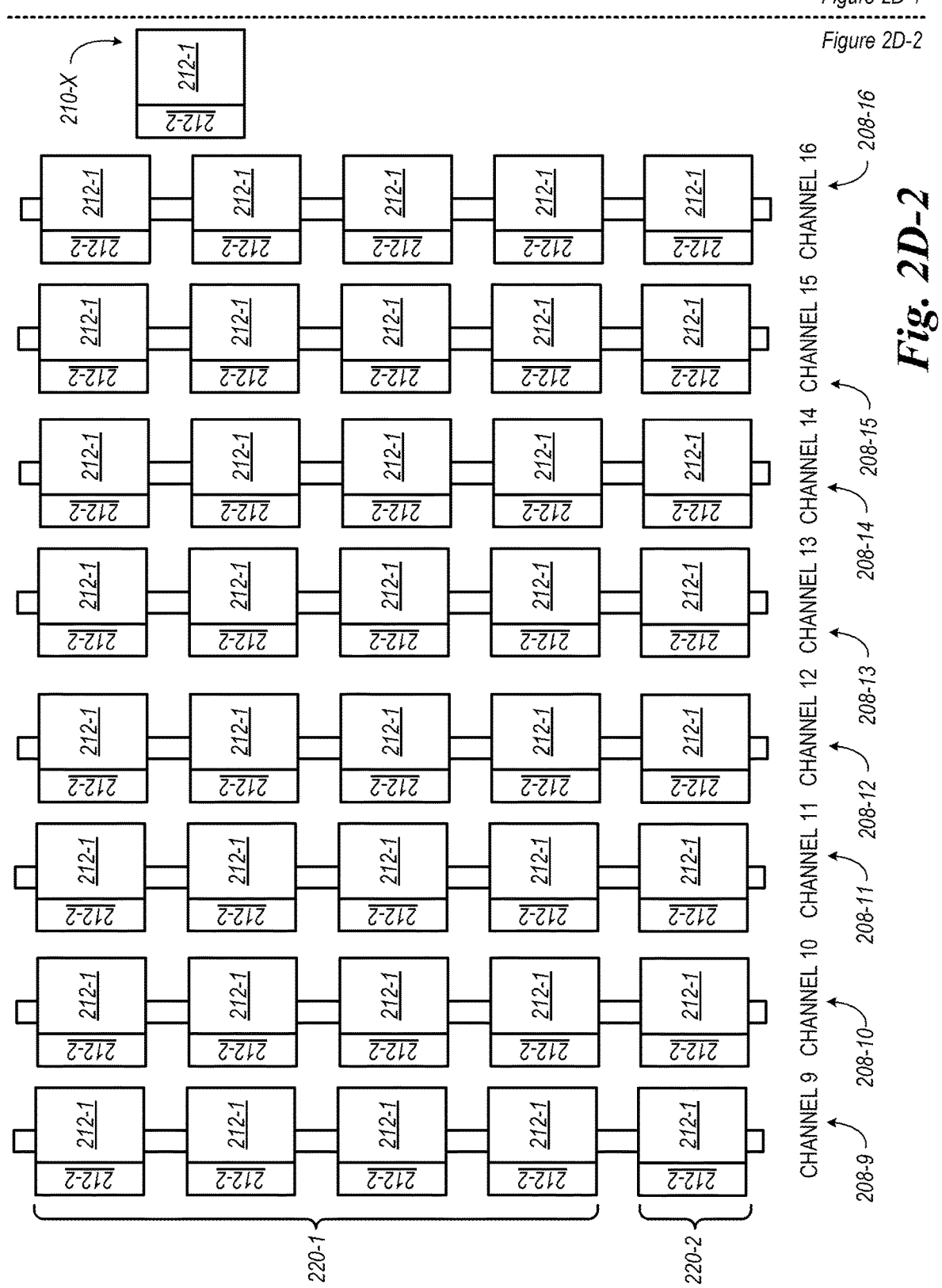

FIGS. 2D-1/2D-2 (collectively referred to as FIG. 2D) illustrate yet another example configuration of memory devices 210 with ECC data in relation to channels 208 in accordance with a number of embodiments of the present disclosure. The memory devices 210 and channels 208 illustrated in FIG. 2D are analogous to memory devices 210 and channels 208, respectively, illustrated in FIG. 2C. For example, one of portions (e.g., portions 212-2) of the memory devices 210 can include single-channel error detection data (e.g., CRC) to provide an error detection capability of detecting errors exceeding a threshold quantity, such as a single error, within respective memory devices. In some embodiments, a different portion (e.g., 212-1) of the memory devices 210 can include host data (as well as single channel error-correction data to provide an error correction capability of correcting a quantity of errors not exceeding the threshold quantity) or multi-channel correction data (e.g., parity data) to provide an error correction capability of correcting a quantity of errors exceeding the threshold quantity. At least one of the memory devices 210 can be an "emerging" memory device, as described above. The example illustrated in FIG. 2D includes sixteen channels 208-1 (CHANNEL 1) to 208-16 (CHANNEL 8). Each channel 208 includes five (or six including a spare memory device 210-X) memory devices corresponding to five ranks (or six ranks including a rank with the spare memory device 210-X). Embodiments are not limited to a particular quantity of channels or to a particular quantity of memory devices per channel.

Although embodiments are not so limited, portions 212-1 and 212-2 of each memory device 212 can be within a same bank. For example, host data (e.g., stored in the portion 212-1) as well as single channel error-detection data (e.g., stored in the portion 212-2) can be accessed from the same bank. In some embodiments, a portion 212-2 of one or more of the memory devices 210 can be accessed via DM pins, while the portion 212-1 of one or more of the memory devices 210 can be accessed via different pins, such as bi-directional DQ pins. There are other types of data that can also be accessed via the DM pins, such as metadata that can be stored in the memory devices 210. Although not depicted in FIG. 2D, each memory device (e.g., memory devices 210) can include more than one or two banks. For example, an example memory device can include 16 and/or 32 banks.

Further, groups of memory devices 220-1 and a group of memory devices 220-2 illustrated in FIG. 2D are analogous to the first groups of memory devices 220-1 and the second group of memory device 220-2 illustrated in FIGS. 2B-2C. For example, memory devices 210 of the group 220-2 can be configured to store ECC data for providing an error correction capability of correcting errors exceeding a threshold quantity for one or more memory devices of the groups of memory devices 220-1. For example, each group of memory devices (e.g., each one of the first groups of memory devices 220-1 and/or second group of memory device 220-2) can be selectively accessed from the other groups, as described herein. As an example, if a read operation performed on particular one of the memory devices 210-1 results in an uncorrectable error (e.g., the quantity of errors in the read data exceeds the threshold correctable by the single channel error-correction data), then the data stored in the memory device 210-1 may be recovered by reading data from the memory devices 210-2, 210-3, 210-4 of the group 220-1 along with the multi-channel error correction data from the corresponding redundant memory device 210-5 of the group 220-2.

The memory system (e.g., the memory system 104 illustrated in FIG. 1) with the configuration illustrated in FIG. 2D can further include a memory device (e.g., memory devices 210-X) that can be configured to operate as a spare device. In the event of, for example, a failure of one of the memory devices 210 of channels 208-1 to 208-16, the memory device 210-X configured to operate as a spare device can be used (operated) in lieu of the failed memory device. In some embodiments, a spare device (e.g., the memory device 210-X) can be coupled to an additional channel (e.g., 17th channel not depicted in FIG. 2D) of the memory system and separately from the other memory devices 210 (e.g., the memory devices 210 of channels 208-1 to 208-16). In some embodiments, each channel can include one or more spare devices (e.g., the memory device 210-X). For example, each channel can include six memory devices (e.g., as opposed to five memory devices as currently illustrated in FIG. 2D) among which one memory device can be configured as a spare device for a respective channel.

In a non-limiting example, an apparatus (e.g., the computing system 100 or the memory system 104 illustrated in FIG. 1) can include a plurality of channels and each one of the plurality of channels can include a respective number of memory devices. The apparatus can further include a controller (e.g., the controller 106 illustrated in FIG. 1) coupled to the plurality of channels. The controller can perform an error detection operation on a number of memory devices (e.g., memory devices 110/210 illustrated in FIGS. 1 and 2, respectively) of a first set of the plurality of channels using first ECC data stored in the first set for indication of a quantity of errors within one or more memory devices of one channel of the first set exceeding a threshold quantity. In response to the indication of the quantity of errors within the one or more memory devices exceeding the threshold quantity, the controller can perform an error correction operation to correct the quantity of errors using host data stored in a number of memory devices of other channels of the first set and second ECC data stored in a number of memory devices of a second set of the plurality of channels. In some embodiments, the controller can access the plurality of channels in parallel. In some embodiments, the first ECC data include CRC codes.

In some embodiments, at least one of a number of memory devices of a third set of the plurality of channels can be a spare device (e.g., memory device 210-X). In this example, the controller can, in response to one memory device of the first set having a quantity of errors exceeding the threshold quantity, operate the at least one of the number of memory devices of the third portion configured as the spare device in replacement of the one memory device. In some embodiments, the controller can be configured to swap the operational roles of the first set and the second set of the plurality of channels to store the host data in the second set of the plurality of channels and the second ECC data in the first set of the plurality of channels.

In another example, a system (e.g., the computing system 100 or the memory system 104 illustrated in FIG. 1) can include a plurality of groups of memory devices (e.g., memory devices 110/210 illustrated in FIGS. 1 and 2, respectively) and each one of the plurality of groups of memory devices can include respective number of memory devices. In this example, each one of a number of memory devices of a first portion of the plurality of groups of memory devices (e.g., the groups of memory devices 220-1) can store first ECC data to correct a quantity of errors not exceeding a threshold quantity and second ECC data for indication of a quantity of errors within data stored each one of the number of memory devices of the first portion exceeding the threshold quantity. Further, a number of memory devices (e.g., the group of memory devices 220-2) of a second portion of the plurality of groups of memory devices can store third ECC data to correct the quantity of errors within data stored each one of the number of memory devices of the first portion exceeding the threshold quantity. The apparatus further includes a controller (e.g., the controller 106 illustrated in FIG. 1) coupled to the plurality of groups of memory devices. The controller can perform an error detection operation on the first portion of the plurality of groups of memory devices using the first ECC data. In response to the indication of at least one of the number of memory devices of the first portion having a quantity of errors exceeding the threshold quantity, the controller can further perform an error correction operation on the at least one of the number of memory devices of the first portion using the third ECC data.

In some embodiments, the controller can be configured to perform an error correction operation on the number of memory devices of the first portion using the first ECC data to correct a quantity of errors not exceeding the threshold quantity. In some embodiments, the controller can access the plurality of groups of memory devices in parallel.

In some embodiments, at least one of the number of memory devices of the first portion and at least one of the number of memory devices of the second portion are coupled to a same channel. In some embodiments, at least one of a number of memory devices of a third portion is a spare device. In this example, the controller can, in response to one memory device of the first portion having a quantity of errors exceeding the threshold quantity, operate the at least one of the number of memory devices of the third portion configured as the spare device in replacement of the one memory device of the first portion.

Figure 2E:
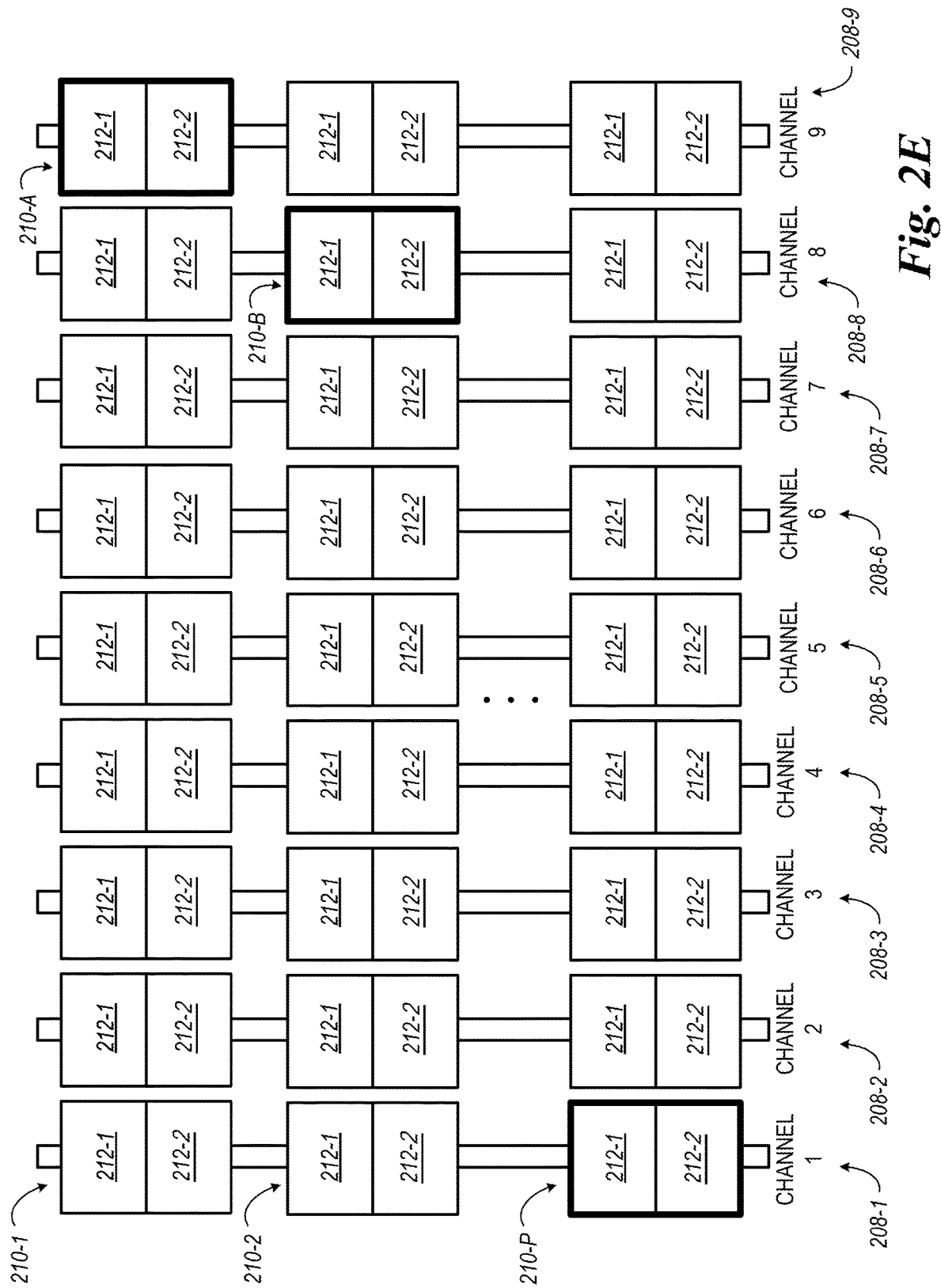
FIG. 2E illustrates yet another example configuration of memory devices with ECC data in relation to channels in accordance with a number of embodiments of the present disclosure.

FIG. 2E illustrates yet another example configuration of memory devices 210 with ECC data in relation to channels 208 in accordance with a number of embodiments of the present disclosure. The memory devices 210 and channels 208 illustrated in FIG. 2E are analogous to memory devices 210 and channels 208, respectively, illustrated in FIGS. 2A-2D. For example, one of portions (e.g., portions 212-2) of the memory devices 210 illustrated in FIG. 2E can include single channel error-detection data (e.g., CRC) to provide an error detection capability of detecting errors exceeding a threshold quantity, such as a single error, within respective memory devices. In some embodiments, a different portion (e.g., 212-1) of the memory devices 210 can include host data (as well as single channel error correction data to provide an error correction capability of correcting a quantity of errors not exceeding the threshold quantity) or multi-channel error correction data (e.g., parity data) to provide an error correction capability of correcting a quantity of errors exceeding the threshold quantity. At least one of the memory devices 210 can be an "emerging" memory device, as described above. The example illustrated in FIG. 2E includes eight channels 208-1 (CHANNEL 1) to 208-9 (CHANNEL 9). Embodiments are not limited to a particular quantity of channels or to a particular quantity of memory devices per channel.

In some embodiments, each portion (e.g., portion 212-1 or 212-2) of each memory device 210 of FIG. 2E can correspond to a bank. For example, a portion 212-1 of each memory device (e.g., memory devices 210) illustrated in FIG. 2E can correspond to one bank, while a portion 212-2 of each memory device illustrated in FIG. 2E can correspond to a different bank.

The memory system (e.g., the memory system 104 illustrated in FIG. 1) of FIG. 2E can include memory devices 210-A, 210-B, . . . , 210-P configured to store multi-channel error correction data for correcting a quantity of errors exceeding a threshold quantity. As an example, if a read operation performed on the memory device 210-1 corresponding to 208-1 (CHANNEL 1) results in an uncorrectable error (e.g., the quantity of errors in the read data exceeds the threshold correctable by the single channel error correction data), then the data stored in the memory device 210-1 may be recovered by reading data from the memory devices 210 corresponding to the other of channels 208-2 to 208-8 (e.g., the other memory devices coupled to CHANNELS 2-8 and located on a same row/rank with the memory device 210-1) along with the multi-channel error correction data from the corresponding redundant memory device 201-A (of channel 208-9 (CHANNEL 9)).

As partially illustrated in FIG. 2E, these memory devices (e.g., memory devices 210-A, 210-B, . . . , 210-P) can be distributed over channels 208-1, . . . , 208-9 such that each channel 208 can include one memory device configured to store the ECC data. In the embodiment illustrated in FIG. 2E, therefore, an overheard of the memory system can be 12.5% (e.g., ⅛). The operational roles of the memory devices 210 can be swapped to configure a different device as a redundant memory device. For example, in FIG. 2E, while the memory devices 210-A, 210-B, . . . , 210-P are configured as redundant memory devices for respective rows of memory devices, a different device can be continuously configured as a redundant memory device such that an operational role as a redundant memory device can be rotated through/among 9 memory devices of a row.

Figure 3:
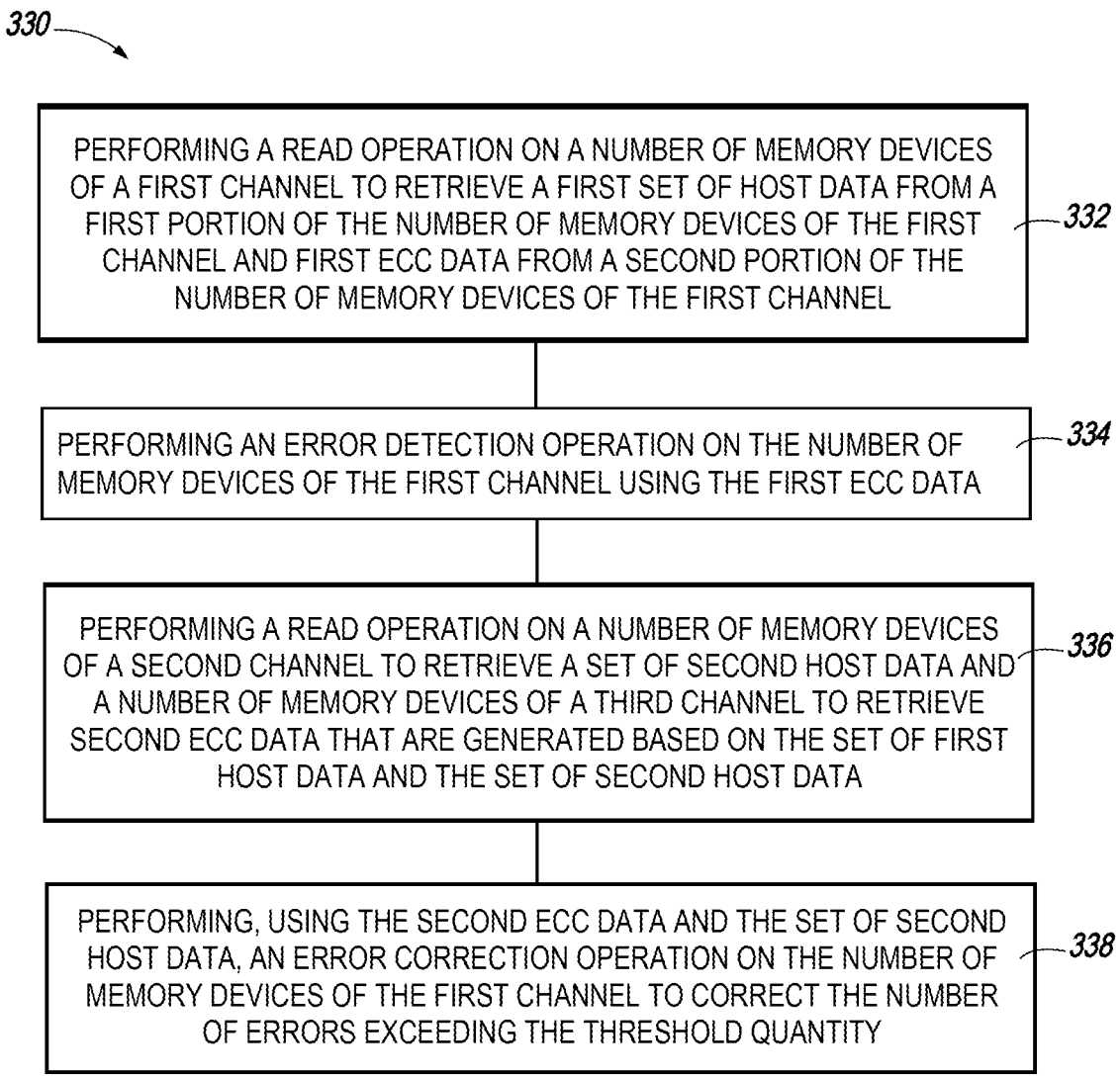
FIG. 3 is a flow diagram representing an example method for memory device protection using single or multiple channels based on a quantity of errors in accordance with a number of embodiments of the present disclosure.

FIG. 3 is flow diagram representing an example method 330 for memory device protection using single or multiple channels based on a quantity of errors in accordance with a number of embodiments of the present disclosure. The method 330 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 330 is performed by the controller 106 illustrated in FIG. 1. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At block 332, the method 330 can include performing a read operation on a number of memory devices of a first channel to retrieve a first set of host data from a first portion of the number of memory devices of the first channel and first ECC data from a second portion of the number of memory devices of the first channel. The number of memory devices can be analogous to the memory devices 110/210 illustrated in FIGS. 1 and 2, herein. The channel (e.g., the first channel) can be analogous to the channel 108/208 illustrated in FIGS. 1 and 2. At block 334, the method 330 can include performing an error detection operation on the number of memory devices of the first channel using the first ECC data.

At block 336, the method 330 can include (in response to an indication, via the error detection operation, of a quantity of errors exceeding a threshold quantity within at least one of the number of memory devices of the first channel) performing a read operation on a number of memory devices of a second channel to retrieve a second set of host data and a number of memory devices of a third channel to retrieve second ECC data that are generated based on the first set of host data and the second set of host data. At block 338, the method 330 can include (in response to detecting, via the error detection operation, a quantity of errors exceeding a threshold quantity within at least one of the number of memory devices of the first channel) performing, using the second ECC data and the second set of host data, an error correction operation on the number of memory devices of the first channel to correct the quantity of errors exceeding the threshold quantity.

In some embodiments, the method 330 can include performing an error correction operation on the number of memory devices of the first channel using third ECC data stored in the first portion of the number of memory devices. In some embodiments, the method 330 can further include performing the error correction operation using the third ECC data without performing a read operation on the number of memory devices of the second channel to retrieve the second set of host data or the number of memory devices of the third channel to retrieve the second ECC data.

In some embodiments, the method 330 can include receiving a write request to write a third set of host data on the number of memory devices of the first channel, generating fourth ECC data based at least in part on the third set of host data, and performing a read-modify-write operation to write the third set of host data on the number of memory devices of the first channel and write the fourth ECC data on the number of memory devices of the third channel. The read-modify-write operation can be performed by applying a programming signal (e.g., a set or reset signal) only to those cells of a groups of cells having data values to be changed. A read-modify-write operation can be selectively chosen to write data values to one or more memory devices. For example, a read-modify-write operation can be performed to write data values to one or more memory devices when the one or more memory devices are coupled to relatively fewer channels (e.g., a single or two channels). When writing data values to memory devices coupled to relatively more channels (e.g., more than two channels), then a normal write operation (e.g., applying a programming signal to all cells of a group of cells) can be performed to write the data values.

Although specific embodiments have been illustrated and described herein, those of ordinary skill in the art will appreciate that an arrangement calculated to achieve the same results can be substituted for the specific embodiments shown. This disclosure is intended to cover adaptations or variations of one or more embodiments of the present disclosure. It is to be understood that the above description has been made in an illustrative fashion, and not a restrictive one. Combination of the above embodiments, and other embodiments not specifically described herein will be apparent to those of skill in the art upon reviewing the above description. The scope of the one or more embodiments of the present disclosure includes other applications in which the above structures and processes are used. Therefore, the scope of one or more embodiments of the present disclosure should be determined with reference to the appended claims, along with the full range of equivalents to which such claims are entitled.

In the foregoing Detailed Description, some features are grouped together in a single embodiment for the purpose of streamlining the disclosure. This method of disclosure is not to be interpreted as reflecting an intention that the disclosed embodiments of the present disclosure have to use more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separate embodiment.

What is claimed is:

1. An apparatus, comprising:
   a group of memory devices; and
   a controller coupled to the group of memory devices, the controller configured to:
   perform, using first error correction code (ECC) data stored in a first portion of the group of memory devices, an error detection operation on the first portion for indication of a quantity of errors exceeding a threshold quantity within the first portion;
   perform an error correction operation on the first portion using at least second ECC data responsive to the indication of the quantity of errors within the first portion exceeding the threshold quantity and that are uncorrectable using third ECC data stored in the first portion of the group of memory devices, wherein the second ECC data is stored in a second portion of the group of memory devices that is coupled to a different channel than a channel to which the first portion of the group of memory devices is coupled; and
   perform an error correction operation using the third ECC data to correct the quantity of errors not exceeding the threshold quantity within the first portion without a read operation on the second portion of the group of memory devices to retrieve the second ECC data;

wherein the controller is further configured to swap operational roles of the first portion and the second portion of the group of memory devices to store the second ECC data in the first portion of the group of memory devices.

2. The apparatus of claim 1, wherein the first ECC data and host data are stored in a same bank of the first portion of the group of memory devices.

3. The apparatus of claim 2, wherein:
the controller is coupled to the first portion of the group of memory devices via a plurality of pins including a data mask (DM) pin; and
the controller is configured to:
receive the host data via a first portion of the plurality of pins; and
receive, in parallel with the data, the first ECC data via a second portion of the plurality of pins including the DM pin.

4. The apparatus of claim 1, wherein host data are stored in a first bank and the first ECC data is stored in a second bank.

5. The apparatus of claim 4, wherein the controller is configured to:
receive the host data from the first bank of the first portion of the group of memory devices; and
perform, using the third ECC stored in the first bank, an error correction operation to correct a quantity of errors not exceeding the threshold quantity on the host data.

6. The apparatus of claim 4, further comprising a cache coupled to the controller, and wherein the controller is configured to receive, in response to the cache configured for storing the first ECC data, the first ECC data from the cache without receiving the first ECC data from the second bank.

7. The apparatus of claim 1, wherein the second ECC data comprises parity bits.

8. The apparatus of claim 1, wherein at least one memory device of the group of memory devices comprises a ferroelectric storage device.

9. An apparatus, comprising:
a plurality of channels, each one of the plurality of channels comprising a respective number of memory devices; and
a controller coupled to the plurality of channels, the controller configured to:
perform an error detection operation on a number of memory devices of a first set of the plurality of channels using first ECC data stored in the first set for indication of a quantity, of errors within one or more memory devices of one channel of the first set exceeding threshold quantity;
in response to the indication of the quantity of errors within the one or more memory devices exceeding the threshold quantity and that are uncorrectable using second ECC data stored in the number of memory devices of the first set, perform an error correction operation to correct the quantity of errors using:
host data stored in a number of memory devices of other channels of the first set; and
third FCC data stored in a number of memory devices of a second set of the plurality of channels; and
perform an error correction operation using second ECC data to correct the quantity of errors not exceeding the threshold quantity without a read operation on the number of memory devices of the second set of the plurality of channels;

wherein the controller is further configured to swap operational roles of the first set and the second set of the plurality of channels to store the host data in the second set of the plurality of channels and the third ECC data in the first set of the plurality of channels.

10. The apparatus of claim 9, wherein:
at least one of a number of memory devices of a third set of the plurality of channels is a spare device; and
the controller is configured to operate, in response to one memory device of the first set having a quantity of errors exceeding the threshold quantity, the spare device in replacement of the one memory device.

11. The apparatus of claim 9, wherein the first ECC data comprises a cyclic redundancy check (CRC).

12. The apparatus of claim 9, wherein the controller is configured to access the plurality of channels in parallel.

13. A system, comprising:
a plurality of groups of memory devices, each one of the plurality of groups of memory devices comprising a respective number of memory devices, wherein:
each one of a number of memory devices of a first portion of the plurality of groups of memory devices configured for storing:
first error correction code (ECC) data to correct a quantity of errors not exceeding a threshold quantity; and
second FCC data for indication of a quantity of errors within data stored in each one of the number of memory devices of the first portion exceeding the threshold quantity; and
a number of memory devices of a second portion of the plurality of groups of memory devices configured for storing third ECC data to correct the quantity of errors within data stored in each one of the number of memory devices of the first portion exceeding the threshold quantity; and
a controller coupled to the plurality of groups of memory devices, the controller configured to:
perform an error correction operation on the number of memory devices of the first portion using the first ECC data to correct the quantity of errors not exceeding the threshold quantity without a read operation on the number of memory devices of the second portion of the plurality of groups of memory devices;
perform an error detection operation on the first portion of the plurality of groups of memory devices using the second ECC data; and
in response to the indication of at least one of the number of memory devices of the first portion having a quantity of errors exceeding the threshold quantity and that are not correctable using the first ECC data, perform an error correction operation on the at least one of the number of memory devices of the first portion using the third ECC data; and
wherein the controller is further configured to swap operational roles of the first portion and the second portion of the group of memory devices to store the third ECC data in the first portion of the group of memory devices.

14. The system of claim 13, wherein at least one of the number of memory devices of the first portion and at least one of the number of memory devices of the second portion are coupled to a same channel.

15. The system of claim 13, wherein at least one of a number of memory devices of a third portion is a spare device, and wherein the controller is configured to, in response to one memory device of the first portion having a quantity of errors exceeding the threshold quantity, operate the spare device in replacement of the one memory device of the first portion.

16. The system of claim 13, wherein the controller is configured to access the plurality of groups of memory devices in parallel.

17. A method, comprising:
- performing a read operation on a number of memory devices of a first channel to retrieve:
  - a first set of host data from a first portion of the number of memory devices of the first channel; and
  - first ECC data from a second portion of the number of memory devices of the first channel;
- performing an error detection operation on the number of memory devices of the first channel using the first ECC data; and
- in response to indication, via the error detection operation, of a quantity of errors exceeding a threshold quantity within at least one of the number of memory devices of the first channel and that are not correctable using second ECC data stored in the first portion of the number of memory devices:
  - performing a read operation on:
    - a number of memory devices of a second channel to retrieve a second set of host data; and
    - a number of memory devices of a third channel to retrieve third ECC data that are generated based on the first set of host data and the second set of host data; and
  - performing, using the third ECC data and the second set of host data, an error correction operation on the number of memory devices of the first channel to correct the quantity of errors exceeding the threshold quantity;
- performing an error correction operation using the second ECC data to correct a quantity of errors not exceeding the threshold quantity without performing a read operation on the number of memory devices of the second channel to retrieve the second set of host data or the number of memory devices of the third channel to retrieve the third ECC data; and
- swapping operational roles of the first channel and the second channel to store the first set of host data in the number of memory devices of the third channel and the third ECC data in the number of memory devices of the first channel.

18. The method of claim 17, further comprising:
- receiving a write request to write a third set of host data on the number of memory devices of the first channel;
- generating fourth ECC data based at least in part on the third set of host data; and
- performing a read-modify-write operation to:
  - write the third set of host data on the number of memory devices of the first channel; and
  - write the fourth ECC data on the number of memory devices of the third channel.

* * * * *